United States Patent
Imamura et al.

(10) Patent No.: US 10,358,138 B2
(45) Date of Patent: Jul. 23, 2019

(54) CONTROL APPARATUS AND CONTROL METHOD FOR VEHICLE

(71) Applicant: TOYOTA JIDOSHA KABUSHIKI KAISHA, Toyota-shi, Aichi-ken (JP)

(72) Inventors: Ken Imamura, Toyota (JP); Hitoshi Matsunaga, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 9 days.

(21) Appl. No.: 15/900,244

(22) Filed: Feb. 20, 2018

(65) Prior Publication Data

US 2018/0244276 A1    Aug. 30, 2018

(30) Foreign Application Priority Data

Feb. 27, 2017  (JP) ................. 2017-035045

(51) Int. Cl.
| | |
|---|---|
| *B60W 30/20* | (2006.01) |
| *B60W 10/02* | (2006.01) |
| *B60W 10/06* | (2006.01) |
| *B60W 10/08* | (2006.01) |
| *B60W 20/00* | (2016.01) |

(52) U.S. Cl.
CPC .......... *B60W 30/20* (2013.01); *B60W 10/026* (2013.01); *B60W 10/06* (2013.01); *B60W 10/08* (2013.01); *B60W 20/00* (2013.01); *B60W 2510/0241* (2013.01); *B60W 2710/025* (2013.01); *B60W 2710/0666* (2013.01); *B60W 2710/083* (2013.01); *B60Y 2200/92* (2013.01); *Y02T 10/6286* (2013.01); *Y10S 903/93* (2013.01); *Y10S 903/946* (2013.01)

(58) Field of Classification Search
CPC .......... B60W 30/20; B60W 2030/203; B60W 2030/206
See application file for complete search history.

(56) References Cited

U.S. PATENT DOCUMENTS

| | | | | | |
|---|---|---|---|---|---|
| 5,064,036 | A | * | 11/1991 | Schneider | B60W 10/02 192/103 F |
| 5,226,513 | A | * | 7/1993 | Shibayama | F16H 61/143 192/3.3 |
| 5,989,156 | A | * | 11/1999 | Matsubara | B60W 10/02 477/169 |

(Continued)

FOREIGN PATENT DOCUMENTS

| | | |
|---|---|---|
| JP | 2004-324847 A | 11/2004 |
| JP | 2009-243639 A | 10/2009 |

*Primary Examiner* — Tisha D Lewis
(74) *Attorney, Agent, or Firm* — Oliff PLC

(57) ABSTRACT

A threshold that is used in determining, based on a deviation between slip amounts, whether to stop slip control or not during the performance of feedback control in slip control is made smaller when pitch damping control is being performed than when pitch damping control is not being performed, during the performance of slip control of a lockup clutch. Therefore, slip control is likely to be stopped when the torque input to the lockup clutch is likely to fluctuate. In consequence, a control apparatus and a control method for a vehicle that make it possible to stably perform slip control of the lockup clutch while increasing the number of opportunities to perform the slip control and pitch damping control are provided.

4 Claims, 2 Drawing Sheets

(56) References Cited

U.S. PATENT DOCUMENTS

| | | | | |
|---|---|---|---|---|
| 6,024,674 A | * | 2/2000 | Sato | B60W 10/02 |
| | | | | 477/102 |
| 7,785,230 B2 | * | 8/2010 | Gibson | B60W 30/20 |
| | | | | 477/101 |
| 2009/0247363 A1 | | 10/2009 | Nagami et al. | |
| 2011/0028269 A1 | * | 2/2011 | Park | B60K 6/365 |
| | | | | 477/5 |

* cited by examiner

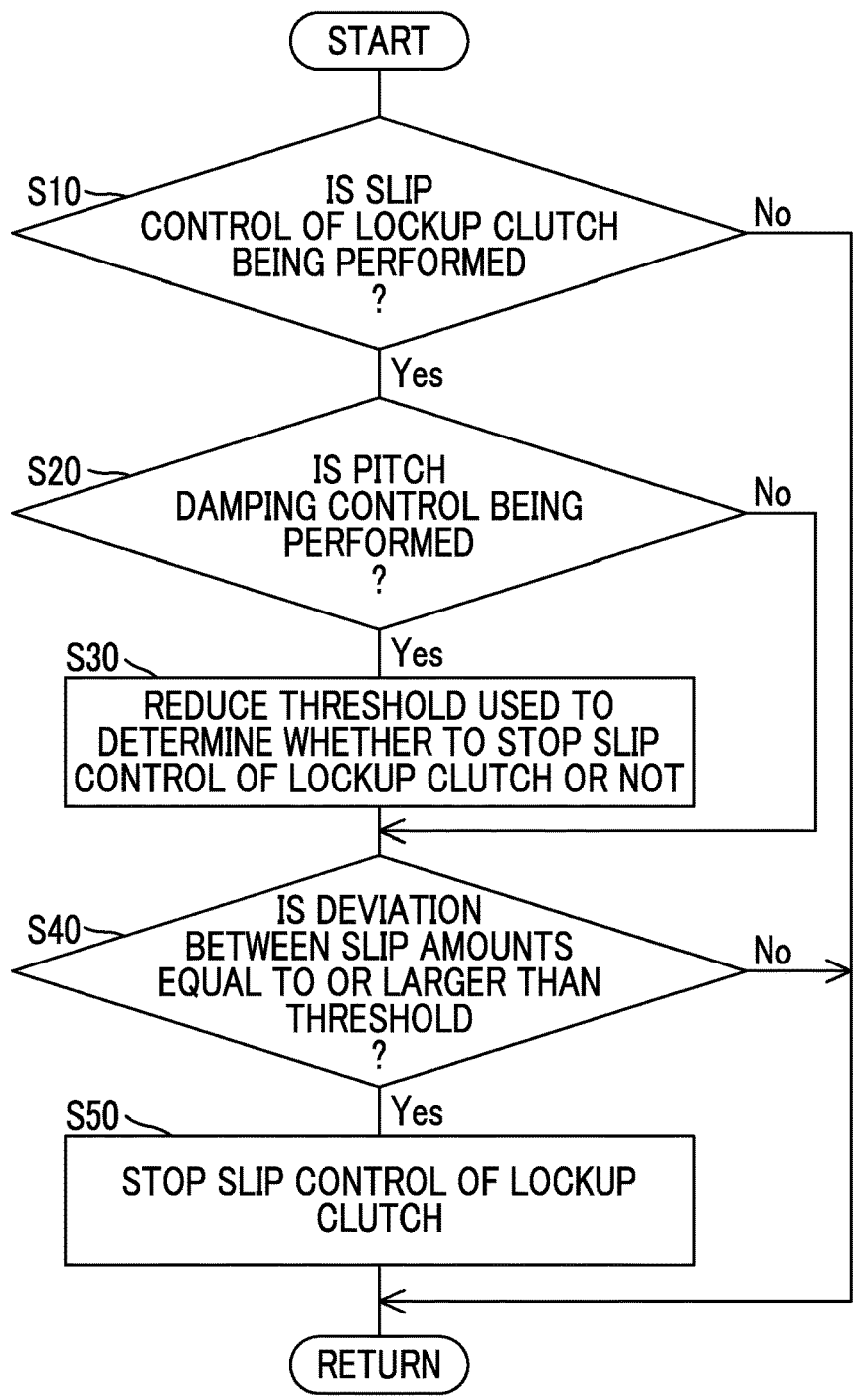

CONTROL APPARATUS AND CONTROL METHOD FOR VEHICLE

CROSS-REFERENCE TO RELATED APPLICATIONS

This application claims priority to Japanese Patent Application No. 2017-035045 filed on Feb. 27, 2017, which is incorporated herein by reference in its entirety.

BACKGROUND

1. Technological Field

The disclosure relates to a control apparatus and a control method for a vehicle that is equipped with a lockup clutch that couples input and output rotary members of a fluid transmission device that is provided in a motive power transmission path between a motive power source and a driving wheel.

2. Description of Related Art

A control apparatus for a vehicle that is equipped with a fluid transmission device provided in a motive power transmission path between a motive power source and a driving wheel and a lockup clutch coupling input and output rotary members of the fluid transmission device is well known. For example, a slip control apparatus for a torque converter described in Japanese Patent Application Publication No. 2004-324847 (JP 2004-324847 A) is an example of such a control apparatus. According to what is disclosed in this Japanese Patent Application Publication No. 2004-324847 (JP 2004-324847 A), in a control apparatus that performs feedback control for compensating for an oil pressure of a lockup clutch such that a slip rotational speed of the lockup clutch becomes equal to a target slip rotational speed, the feedback control is suppressed when the deviation between the target slip rotational speed and an actual slip rotational speed is equal to or higher than a set value during the feedback control.

SUMMARY

By the way, it is conceivable to perform pitch damping control for damping pitch vibrations of a vehicle by fluctuating the output torque of a motive power source with respect to the pitch vibrations. On the other hand, it is conceivable to correct the oil pressure supplied to a lockup clutch through feedback control such that the actual slip amount in the lockup clutch becomes equal to a target slip amount, during slip control for operating the lockup clutch in a slipping manner. In this slip control, a desired slip state of the lockup clutch is realized through the adjustment of the oil pressure supplied to the lockup clutch with respect to the load input to the lockup clutch (which is synonymous with the torque input to the lockup clutch). Therefore, when slip control and pitch damping control are performed in an overlapping manner, slip control may not be stabilized due to fluctuations in the torque input to the lockup clutch resulting from fluctuations in the output torque of the motive power source. In contrast, it is conceivable to refrain from performing slip control and pitch damping control in an overlapping manner. However, when an effect of enhancing fuel economy through slip control and an effect of improving riding comfort and operational stability through pitch damping control are taken into account, it is desirable to refrain, to the utmost, from limiting the opportunities to perform slip control and pitch damping control.

The disclosure has been made in view of the foregoing background. The disclosure provides a control apparatus and a control method for a vehicle that make it possible to stably perform slip control of a lockup clutch while increasing the number of opportunities to perform the slip control and pitch damping control.

Thus, according to one aspect of the disclosure, there is provided a control apparatus for a vehicle configured as follows. This vehicle is equipped with a motive power source, a fluid transmission device that is provided in a motive power transmission path between the motive power source and a driving wheel, and a lockup clutch that is configured to couple an input rotary member and an output rotary member of the fluid transmission device to each other. The control apparatus is equipped with an electronic control unit. This control apparatus is configured to (i) correct an oil pressure supplied to the lockup clutch through feedback control such that an actual amount of slip in the lockup clutch becomes equal to a target slip amount, during slip control for operating the lockup clutch in a slipping manner, (ii) stop the slip control during the slip control, when a deviation between the actual amount of slip and the target slip amount is equal to or larger than a threshold when the feedback control is being performed, (iii) perform pitch damping control for damping pitch vibrations of the vehicle by fluctuating an output torque of the motive power source, and (iv) make the threshold smaller during the slip control, when the pitch damping control is being performed than when the pitch damping control is not being performed.

According to another aspect of the disclosure, there is provided a control method for a vehicle configured as follows. This vehicle is equipped with a motive power source, a fluid transmission device that is provided in a motive power transmission path between the motive power source and a driving wheel, and a lockup clutch that is configured to couple an input rotary member and an output rotary member of the fluid transmission device to each other. The control method includes (i) correcting an oil pressure supplied to the lockup clutch through feedback control such that an actual amount of slip in the lockup clutch becomes equal to a target slip amount, during slip control for operating the lockup clutch in a slipping manner, (ii) stopping the slip control during the slip control, when a deviation between the actual amount of slip and the target slip amount is equal to or larger than a threshold when the feedback control is being performed, (iii) performing pitch damping control for damping pitch vibrations of the vehicle by fluctuating an output torque of the motive power source, and (iv) making the threshold smaller during the slip control, when the pitch damping control is being performed than when the pitch damping control is not being performed.

According to the control apparatus and the control method for the vehicle, the threshold that is used in determining, based on the deviation between the actual amount of slip and the target slip amount, whether to stop slip control or not during the performance of feedback control in slip control is made smaller when pitch damping control is being performed than when pitch damping control is not being performed, during the performance of slip control. Therefore, slip control is likely to be stopped when the torque input to the lockup clutch is likely to fluctuate. In consequence, slip control of the lockup clutch can be stably performed while increasing the number of opportunities to perform the slip control and pitch damping control.

Besides, in the control apparatus and the control method, the threshold may be reduced as an amplitude of the output torque of the motive power source that is fluctuated at a time of performance of the pitch damping control increases.

According to the control apparatus and the control method, the threshold is reduced as the amplitude of the output torque of the motive power source that is fluctuated at the time of the performance of pitch damping control increases. Therefore, when the amplitude of the output torque of the motive power source (i.e., the torque input to the lockup clutch) that is fluctuated at the time of the performance of pitch damping control is small, slip control is likely to be continued. On the other hand, when the amplitude of the output torque of the motive power source that is fluctuated at the time of the performance of pitch damping control is large, slip control is likely to be stopped. In consequence, slip control of the lockup clutch can be stably performed while increasing the number of opportunities to perform the slip control.

BRIEF DESCRIPTION OF THE DRAWINGS

Features, advantages, and technical and industrial significance of an exemplary embodiment of the disclosure will be described below with reference to the accompanying drawings, in which like numerals denote like elements, and wherein:

FIG. 2 is a flowchart illustrating an essential part of control operation of an electronic control unit, namely, control operation for stably performing slip control of a lockup clutch while increasing the number of opportunities to perform the slip control and pitch damping control.

DETAILED DESCRIPTION OF EMBODIMENT

Figure 1:
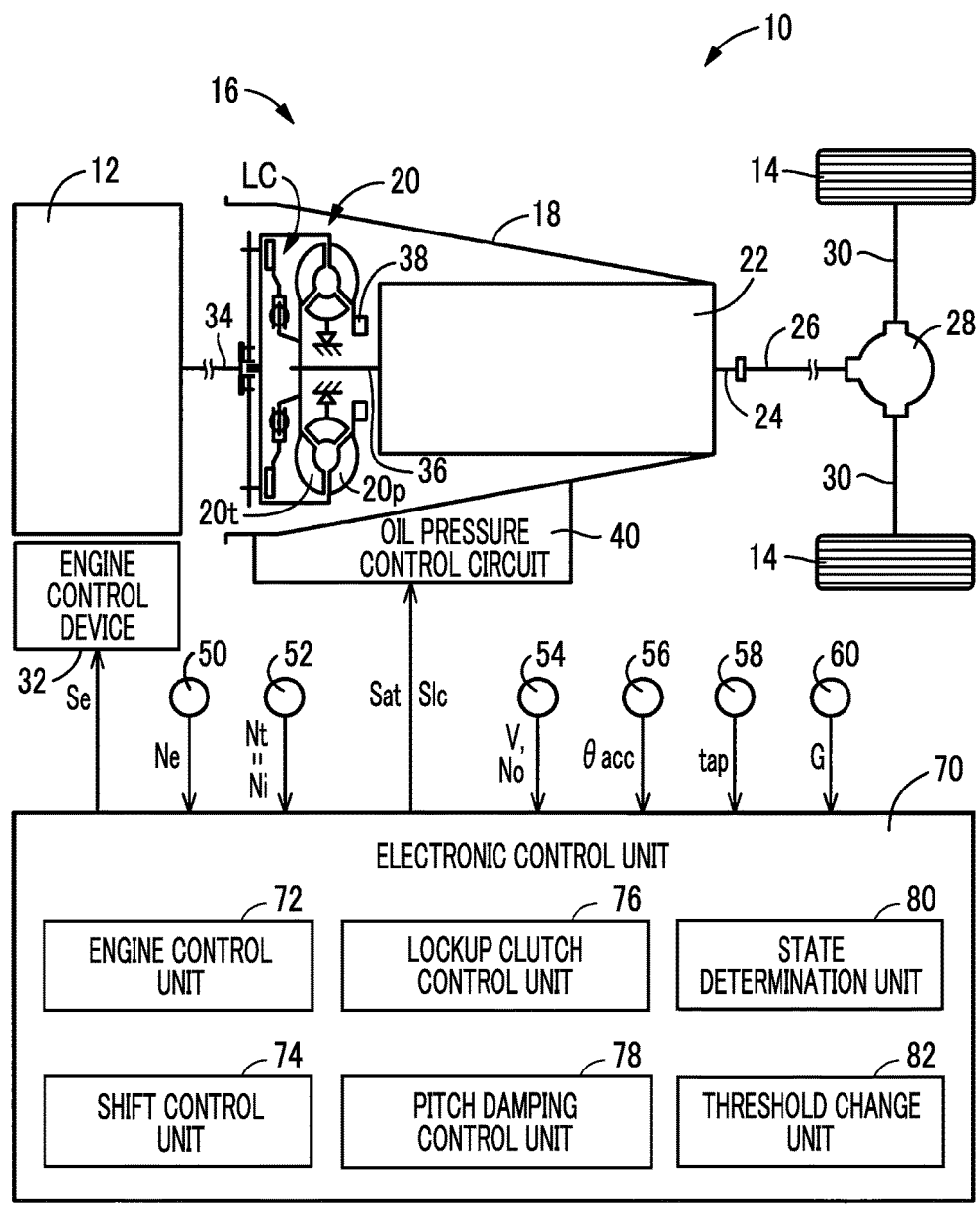
FIG. 1 is a view illustrating the schematic configuration of a vehicle to which the disclosure is applied, and is a view illustrating essential parts of control functions and a control system for various kinds of control in the vehicle.

In the embodiment of the disclosure, the vehicle is equipped with an automatic transmission that transmits a motive power from the motive power source, which has been input via the fluid transmission device, to the driving wheel. The motive power source is an engine, for example, a gasoline engine, a diesel engine or the like that generates a motive power through the combustion of fuel, and/or an electric motor or the like. The automatic transmission is, for example, a known planetary gear-type automatic transmission, a known belt-type or toroidal-type continuously variable transmission, or the like.

Besides, the lockup clutch is, for example, a friction clutch whose operation state is changed over due to a change in the oil pressure applied to a clutch piston that is pressed against a front cover, a multiple-disc friction clutch, or the like.

The embodiment of the disclosure will be described hereinafter in detail with reference to the drawings. FIG. 1 is a view illustrating the schematic configuration of a vehicle 10 to which the disclosure is applied, and is a view illustrating an essential part of a control system for various kinds of control in the vehicle 10. In FIG. 1, the vehicle 10 is equipped with an engine 12 as a motive power source, driving wheels 14, and a motive power transmission device 16 that is provided in a motive power transmission path between the engine 12 and the driving wheels 14. The motive power transmission device 16 is equipped with a torque converter 20 and an automatic transmission 22 that are disposed in a case 18 as a non-rotary member that is attached to a vehicle body, a propeller shaft 26 that is coupled to a transmission output shaft 24 as an output rotary member of the automatic transmission 22, a differential gear 28 that is coupled to the propeller shaft 26, a pair of drive shafts 30 that are coupled to the differential gear 28, and the like. In the motive power transmission device 16, a motive power (which is synonymous with a torque and a force when no particular distinction is made) that is output from the engine 12 is transmitted to the driving wheels 14 sequentially via the torque converter 20, the automatic transmission 22, the propeller shaft 26, the differential gear 28, the drive shafts 30, and the like.

The engine 12 is equipped with an engine control device 32 having various components that are required for output control of the engine 12, such as an electronic throttle device, a fuel injection device, an ignition device, and the like. In the engine 12, the engine control device 32 is controlled in accordance with an operation amount of an accelerator pedal (an accelerator operation amount) $\theta acc$ corresponding to a drive amount required of the vehicle 10 by a driver, by an electronic control unit 70 that will be described later. Thus, the output torque of the engine 12 (i.e., an engine torque Te) is controlled. For this reason, a throttle opening degree tap as an opening degree of a throttle valve with which the electronic throttle device is equipped, or the like is also a value corresponding to the required drive amount.

The torque converter 20 is a fluid transmission device that is disposed in a motive power transmission path between the engine 12 and the automatic transmission 22 and that is equipped with a pump impeller $20p$ and a turbine impeller $20t$. The pump impeller $20p$ is an input rotary member of the torque converter 20, and is coupled to a crankshaft 34 of the engine 12. The turbine impeller $20t$ is an output rotary member of the torque converter 20, and is coupled to a transmission input shaft 36 as an input rotary member of the automatic transmission 22. The transmission input shaft 36 is also a turbine shaft. Besides, the motive power transmission device 16 is equipped with a known lockup clutch LC as a directly-coupled clutch that couples the pump impeller $20p$ and the turbine impeller $20t$ to each other (i.e., that couples input/output rotary members of the torque converter 20 to each other). Besides, the motive power transmission device 16 is equipped with a mechanical oil pump 38 that is coupled to the pump impeller $20p$. Being rotationally driven by the engine 12, the oil pump 38 discharges the hydraulic oil for use in shift control of the automatic transmission 22, for use in changeover control of the operation state of the lockup clutch LC, and for supplying lubricating oil to respective portions of the motive power transmission device 16. That is, the hydraulic oil pumped up by the oil pump 38 is supplied as an original pressure of an oil pressure control circuit 40 with which the vehicle 10 is equipped.

The lockup clutch LC is a hydraulic friction clutch that is frictionally engaged by being supplied with an oil pressure (hereinafter referred to as an LC oil pressure) from the oil pressure control circuit 40. The LC oil pressure is controlled by the electronic control unit 70 that will be described later, so the operation state of the lockup clutch LC is changed over. The operation state of the lockup clutch LC includes a lockup release state where the lockup clutch LC is released (lockup-off), a slip state where the lockup clutch LC is operated in a slipping manner while sliding, and a lockup state where the lockup clutch LC is engaged (lockup-on). By rendering the lockup clutch LC in the state of lockup-off, the torque converter 20 obtains a torque amplification effect.

Besides, by rendering the lockup clutch LC in the state of lockup-on, the pump impeller $20p$ and the turbine impeller $20t$ are integrally rotated, and the motive power of the engine 12 is directly transmitted to the automatic transmission 22 side. Besides, by rendering the lockup clutch LC in the slip state such that a slip amount Ns (=an engine rotational speed Ne—a turbine rotational speed Nt; which will be referred to also as a slip rotational speed or a differential rotational speed) in the lockup clutch LC becomes equal to a target slip amount Nst, the engine rotational speed Ne is restrained from racing, and noise such as booming noise or the like is suppressed, when the vehicle 10 is driven (when power is on). On the other hand, the crankshaft 34 of the engine 12 is rotated with the target slip amount Nst in such a manner as to follow the transmission input shaft 36 when the vehicle 10 is not driven (when power is off). As a result, for example, a fuel cut region is enlarged.

The automatic transmission 22 is a stepped transmission that constitutes part of the motive power transmission path between the engine 12 and the driving wheels 14. The automatic transmission 22 is, for example, a known planetary gear-type automatic transmission that is equipped with a plurality of sets of planetary gear devices and a plurality of hydraulic frictional engagement devices (hereinafter referred to as AT engagement devices) such as clutches, brakes and the like. The torque capacity of each of the AT engagement devices is changed by each engagement oil pressure adjusted and output from a solenoid valve or the like in the oil pressure control circuit 40. Thus, the operation state (states such as engagement, release and the like) of each of the AT engagement devices is changed over. One of shift speeds (gear stages) that are different in a speed ratio (a gear ratio) γ (=an AT input rotational speed Ni/an AT output rotational speed No) from one another is formed in the automatic transmission 22, through engagement of a predetermined one of the AT engagement devices. The operation states of the AT engagement devices are controlled in accordance with an operation of an accelerator by a driver, a vehicle speed V, or the like by the electronic control unit 70 that will be described later. Thus, the gear stage formed in the automatic transmission 22 is changed over (i.e., one of a plurality of gear stages is selectively formed). Incidentally, instead of a stepped transmission, a known continuously variable transmission of belt type or the like can also be used as the automatic transmission 22.

The control apparatus for the vehicle 10 associated with the control of the lockup clutch LC and the like is equipped with the electronic control unit 70 as a controller. The electronic control unit 70 is configured to include a so-called microcomputer that is equipped with, for example, a CPU, a RAM, a ROM, an input/output interface and the like. The CPU performs various kinds of control of the vehicle 10 by carrying out a signal process in accordance with a program stored in advance in the ROM while utilizing a temporary storage function of the RAM. The electronic control unit 70 is configured, if necessary, as separate electronic control units, namely, an electronic control unit for engine control, an electronic control unit for oil pressure control (for shift control), and the like.

Various signals based on detection values of various sensors and the like with which the vehicle 10 is equipped, and the like, such as the AT output rotational speed No as a rotational speed of the transmission output shaft 24 corresponding to the vehicle speed V, an accelerator operation amount θacc representing the magnitude of an acceleration operation performed by the driver, the throttle opening degree tap, accelerations G in respective directions of the vehicle 10, and the like are supplied to the electronic control unit 70. It should be noted herein that the various sensors are, for example, an engine rotational speed sensor 50, an input rotational speed sensor 52, an output rotational speed sensor 54, an accelerator operation amount sensor 56, a throttle opening degree sensor 58, an acceleration sensor 60, and the like. The various signals are, for example, the engine rotational speed Ne as a rotational speed of the engine 12, the AT input rotational speed Ni (=the turbine rotational speed Nt) as a rotational speed of the transmission input shaft 36, and the like. Besides, various command signals are output to various devices with which the vehicle 10 is equipped, from the electronic control unit 70. It should be noted herein that the various devices are, for example, the engine control device 32, the oil pressure control circuit 40, and the like. Besides, the various command signals are, for example, an engine control command signal Se for controlling the engine 12, an oil pressure control command signal Sat for controlling the operation states of the AT engagement devices, an oil pressure control command signal Slc for controlling the operation state of the lockup clutch LC, and the like. This oil pressure control command signal Sat is output to the oil pressure control circuit 40. Then, this oil pressure control command signal Sat is, for example, a command signal for driving the solenoid valve for adjusting the engagement oil pressure supplied to each of hydraulic actuators of the AT engagement devices, and the like, namely, a drive current corresponding to a command pressure corresponding to each set engagement oil pressure. Besides, the oil pressure control command signal Slc is output to the oil pressure control circuit 40. Then, this oil pressure control command signal Slc is, for example, a command signal for driving a solenoid valve for adjusting the LC oil pressure, and the like.

The electronic control unit 70 is equipped with an engine control unit 72, a shift control unit 74, a lockup clutch control unit 76, and a pitch damping control unit 78, to realize various kinds of control in the vehicle 10.

The engine control unit 72 controls the engine 12 such that the required engine torque Te is obtained. For example, the engine control unit 72 calculates a required drive torque Tdem as a required drive amount, by applying the vehicle speed V and the accelerator operation amount θacc to a relationship obtained in advance through an experiment or from the standpoint of design and stored (i.e., determined in advance) (e.g., a driving force map). The engine control unit 72 outputs the engine control command signal Se for controlling the engine control device 32 such that the engine torque Te realizing the required drive torque Tdem is obtained, in view of the gear stage of the automatic transmission 22. Instead of the required drive torque Tdem (Nm) in the driving wheels 14, a required driving force Fdem (N) in the driving wheels 14, a required drive power Pdem (W) in the driving wheels 14, a required transmission output torque Todem in the automatic transmission 22, or the like can also be used as the required drive amount. Besides, it is also possible to simply use the acceleration operation amount θacc (%), the throttle opening degree tap (%), or the like as the required drive amount.

The shift control unit 74 performs shift control of the automatic transmission 22. For example, the shift control unit 74 makes a determination on the shifting of the automatic transmission 22 by applying the vehicle speed V (which is synonymous with the AT output rotational speed No or the like) and the accelerator operation amount θacc (which is synonymous with the required drive torque Tdem, the throttle opening degree tap, or the like) to a predetermined relationship (e.g., a shift map), and outputs the oil pressure control command signal Sat for changing over the operation states of the AT engagement devices to the oil pressure control circuit 40, in such a manner as to change over the gear stage of the automatic transmission 22 if necessary.

The lockup clutch control unit 76 controls the operation state of the lockup clutch LC. For example, the lockup clutch control unit 76 determines in which one of a lockup-off region, a slip operation region, and a lockup-on region the lockup clutch LC is, by applying the vehicle speed V (which is synonymous with the AT output rotational speed No or the like) and the accelerator operation amount θacc (which is synonymous with the required drive torque Tdem, the throttle opening degree tap or the like) to a predetermined relationship (e.g., a lockup region line map) having the lockup-on region, the slip operation region, and the lockup-on region, and outputs the oil pressure control command signal Slc for supplying the LC oil pressure at which the operation state corresponding to the determined region is realized to the lockup clutch LC, to the oil pressure control circuit 40.

When it is determined that the lockup clutch LC is in the lockup-on region, the lockup clutch control unit 76 sets the LC oil pressure for obtaining the torque capacity of the lockup clutch LC (i.e., a clutch torque Tlu) that enables the transmission of the engine torque Te (i.e., the torque input to the lockup clutch LC), and performs lockup control for rendering the lockup clutch LC in the lockup-on state.

When the clutch torque Tlu is small with respect to the engine torque Te, the lockup clutch LC slides. When it is determined that the lockup clutch LC is in the slip operation region, the lockup clutch control unit 76 sets the LC oil pressure for realizing the target slip amount Nst with respect to the engine torque Te, and performs slip control for operating the lockup clutch LC in a slipping manner (i.e., rendering the lockup clutch LC in the slip state). In the lockup region line map, the slip operation region is set in a lower vehicle speed region than, for example, the lockup-on region. That is, in this slip operation region, it is difficult to perform lockup control, and an attempt to improve fuel economy and drivability is made as the slip state. Besides, the slip operation region is also a region that is set in consideration of drivability, booming noise and the like (e.g., NV (noise/vibration) performance). Therefore, the target slip amount Nst is determined in such a manner as to increase as the lockup clutch LC approaches the region where there is a disadvantage in booming noise or the like resulting from, for example, the lockup-on state, namely, as the lockup clutch LC approaches the region where the engine torque Te is large or the region where the engine rotational speed Ne is low.

The lockup clutch control unit 76 corrects the LC oil pressure through feedback control such that the actual amount of slip Ns (referred to also as the actual slip amount Ns) in the lockup clutch LC becomes equal to the target slip amount Nst, during the performance of slip control of the lockup clutch LC. For example, the lockup clutch control unit 76 starts slip control in the form of feedforward control according to the set LC oil pressure, and then calculates a feedback LC oil pressure as a feedback correction amount, by applying a deviation between the actual slip amount Ns and the target slip amount Nst (referred to also as a slip amount deviation) $\Delta Ns$ (=Ns−Nst) to a predetermined feedback control equation having a proportional term (a P component), an integral term (an I component), and a differential term (a D component). The lockup clutch control unit 76 corrects the LC oil pressure through the use of the calculated feedback LC oil pressure. Feedback control is started when the actual slip amount Ns becomes equal to or smaller than a predetermined slip amount or when the slip amount deviation $\Delta Ns$ becomes equal to or smaller than a predetermined deviation, etc., after slip control is started in the form of, for example, feedforward control.

When the slip amount deviation $\Delta Ns$ becomes large during the performance of feedback control in slip control of the lockup clutch LC, the continuation of feedback control (hence the continuation of slip control) is considered to be unfavorable. The lockup clutch control unit 76 determines whether or not the slip amount deviation $\Delta Ns$ is equal to or larger than a threshold $\Delta Nsth$ during the performance of feedback control. If it is determined that the slip amount deviation $\Delta Ns$ is equal to or larger than the threshold $\Delta Nsth$ during the performance of feedback control, the lockup clutch control unit 76 stops feedback control and stops slip control. The threshold $\Delta Nsth$ is, for example, a predetermined upper limit of the slip amount deviation $\Delta Ns$ for determining whether to continue feedback control or not.

The pitch damping control unit 78 determines, based on, for example, the acceleration G, whether or not pitch vibrations (which are synonymous with pitching) of the vehicle 10 are caused. The pitch vibrations are caused to the vehicle, for example, when irregularities of a road surface are passed, when the vehicle runs on an undulatory road, when an operation of depressing the accelerator pedal and an operation of returning the accelerator pedal are repeated within a short time, etc. During the pitch vibrations, the vehicle vibrates such that front and rear ends of the vehicle 10 move around a lateral axis of the vehicle 10 substantially in a vertical direction and in opposite phases. If it is determined that pitch vibrations of the vehicle 10 are caused, the pitch damping control unit 78 performs pitch damping control for damping pitch vibrations of the vehicle 10 by fluctuating the engine torque Te. For example, the pitch damping control unit 78 performs pitch damping control by fluctuating (i.e., increasing/reducing) the engine torque Te in the opposite phase of pitch vibrations and with an amplitude corresponding to the magnitude of pitch vibrations (e.g., an amplitude), in such a manner as to damp pitch vibrations.

By the way, slip control of the lockup clutch LC is performed by adjusting the LC oil pressure with respect to the torque input to the lockup clutch LC, in such a manner as to realize the target slip amount Nst. Accordingly, when the engine torque Te fluctuates or when the input from the driving wheel 14 sides fluctuates, it becomes difficult to stably perform slip control, so a deterioration in the NV performance of the vehicle 10 and a degradation in the function of a friction material of the lockup clutch LC may be incurred. On the other hand, pitch damping control is a technology for fluctuating the engine torque Te in such a manner as to damp pitch vibrations of the vehicle 10. Besides, pitch damping control that is performed when the frequency of irregularities of a road surface is high etc. may not be able to effectively damp pitch vibrations because of a delay of response in fluctuating the engine torque Te or due to the influence of a difficulty to create the opposite phase of pitch vibrations or the like. Therefore, when pitch damping control is performed during the performance of slip control, it may become difficult to stably perform slip control due to fluctuations in the torque input to the lockup clutch LC.

In contrast, the electronic control unit 70 stops feedback control and stops slip control when the slip amount deviation $\Delta Ns$ is a smaller value, in the case where slip control of the lockup clutch LC and pitch damping control are performed in an overlapping manner than in the case where only slip control is performed.

In concrete terms, the electronic control unit 70 is further equipped with a state determination unit 80 and a threshold change unit 82 to realize the above-mentioned control function of stopping slip control of the lockup clutch LC.

The state determination unit 80 determines whether or not slip control of the lockup clutch LC is being performed. Besides, the state determination unit 80 determines whether or not pitch damping control is being performed.

If the state determination unit 80 determines that slip control of the lockup clutch LC is being performed, the threshold change unit 82 makes the threshold $\Delta Nsth$ smaller when the state determination unit 80 determines that pitch damping control is being performed than when the state determination unit 80 determines that pitch damping control is not being performed. For example, the threshold change unit 82 sets the threshold $\Delta Nsth$ to a first threshold $\Delta Nsth1$ when pitch damping control is not being performed, and sets the threshold $\Delta Nsth$ to a second threshold $\Delta Nsth2$ that is smaller than the first threshold $\Delta Nsth1$ when pitch damping control is being performed. The first threshold $\Delta Nsth1$ is a value determined in advance as the threshold $\Delta Nsth$ in the case where pitch damping control is not being performed. The second threshold $\Delta Nsth2$ is a value determined in advance as the threshold $\Delta Nsth$ in the case where pitch damping control is being performed.

As the amplitude of the engine torque Te that is fluctuated at the time of the performance of pitch damping control increases, the amplitude of the fluctuated torque input to the lockup clutch LC increases, so it is considered to become difficult to stably perform slip control. Therefore, the electronic control unit 70 may stop slip control when the slip amount deviation $\Delta Ns$ becomes equal to a value that decreases as the amplitude of the engine torque Te that is fluctuated at the time of the performance of pitch damping control increases. That is, the threshold change unit 82 may reduce the threshold $\Delta Nsth$ (especially the second threshold $\Delta Nsth2$) as the amplitude of the engine torque Te that is fluctuated at the time of the performance of pitch damping control increases.

FIG. 2 is a flowchart illustrating an essential part of control operation of the electronic control unit 70, namely, the control operation for stably performing slip control of the lockup clutch LC while increasing the number of opportunities to perform the slip control and pitch damping control. This flowchart is repeatedly executed during, for example, the running of the vehicle 10.

In FIG. 2, first of all in step (the word "step" will be omitted hereinafter) S10 corresponding to the function of the state determination unit 80, it is determined whether or not slip control of the lockup clutch LC is being performed. If the result of the determination in this S10 is negative, the present routine is ended. If the result of the determination in this S10 is positive, it is determined in S20 corresponding to the function of the state determination unit 80 whether or not pitch damping control is being performed. If the result of the determination in this S20 is positive, the threshold $\Delta Nsth$ that is used in determining whether to stop slip control of the lockup clutch LC or not is reduced in S30 corresponding to the function of the threshold change unit 82. For example, the threshold $\Delta Nsth$ is set to the second threshold $\Delta Nsth2$ that is smaller than the first threshold $\Delta Nsth1$ that is set when the result of the determination in the aforementioned S20 is negative. If the result of the determination in the aforementioned S20 is negative, or subsequently to the aforementioned S30, it is determined in S40 corresponding to the function of the lockup clutch control unit 76 whether or not the slip amount deviation $\Delta Ns$ is equal to or larger than the threshold $\Delta Nsth$ during the performance of feedback control in slip control of the lockup clutch LC. If the result of the determination in this S40 is negative, the present routine is ended. If the result of the determination in this S40 is positive, feedback control in slip control of the lockup clutch LC is stopped, and the slip control is stopped, in S50 corresponding to the function of the lockup clutch control unit 76.

As described above, according to the present embodiment of the disclosure, the threshold $\Delta Nsth$ that is used in determining, based on the slip amount deviation $\Delta Ns$, whether to stop slip control or not during the performance of feedback control in slip control is made smaller when pitch damping control is being performed than when pitch damping control is not being performed, during the performance of slip control of the lockup clutch LC. Therefore, slip control is likely to be stopped when the torque input to the lockup clutch LC is likely to fluctuate. In consequence, slip control of the lockup clutch LC can be stably performed while increasing the number of opportunities to perform the slip control and pitch damping control.

Besides, according to the present embodiment of the disclosure, the threshold $\Delta Nsth$ (especially the second threshold $\Delta Nsth2$) is reduced as the amplitude of the engine torque Te that is fluctuated at the time of the performance of pitch damping control increases. Therefore, when the amplitude of the engine torque Te (i.e., the torque input to the lockup clutch LC) that is fluctuated at the time of the performance of pitch damping control is small, slip control is likely to be continued. On the other hand, when the amplitude of the engine torque Te that is fluctuated at the time of the performance of pitch damping control is large, slip control is likely to be stopped. In consequence, slip control of the lockup clutch LC can be stably performed while increasing the number of opportunities to perform the slip control.

Although the embodiment of the disclosure has been described above in detail based on the drawings, the disclosure is also applied to other aspects thereof.

For example, in the foregoing embodiment of the disclosure, the engine 12 is exemplified as a motive power source of the vehicle 10, but the disclosure is not limited to this aspect thereof. For example, as the motive power source, another prime mover such as an electric motor or the like can be adopted in combination with or instead of the engine 12. In a vehicle that is equipped with the engine 12 and the electric motor, pitch damping control is performed by fluctuating the output torque of the electric motor, in view of responsiveness and controllability.

Besides, in the foregoing embodiment of the disclosure, the slip amount deviation $\Delta Ns$ may be an absolute value of the difference between the actual slip amount Ns and the target slip amount Nst.

Besides, in the foregoing embodiment of the disclosure, the torque converter 20 is exemplified as the fluid transmission device, but the disclosure is not limited to this aspect thereof. For example, another fluid transmission device such as a fluid coupling with no torque amplification effect, or the like may be used instead of the torque converter 20.

Incidentally, the foregoing is nothing more than one embodiment of the disclosure. The disclosure can be carried out in a mode subjected to various alterations and improvements.

What is claimed is:

1. A control apparatus for a vehicle, the vehicle including a motive power source, a fluid transmission device that is provided in a motive power transmission path between the motive power source and a driving wheel of the vehicle, and a lockup clutch that is configured to couple an input rotary member and an output rotary member of the fluid transmission device to each other, the control apparatus comprising:

an electronic control unit that is configured to (i) correct an oil pressure supplied to the lockup clutch through feedback control such that an actual amount of slip in the lockup clutch becomes equal to a target slip amount, during slip control for operating the lockup clutch in a slipping manner, (ii) stop the slip control during the slip control, when a deviation between the actual amount of slip and the target slip amount is equal to or larger than a threshold when the feedback control is being performed, (iii) perform pitch damping control for damping pitch vibrations of the vehicle by fluctuating an output torque of the motive power source, and (iv) make the threshold smaller during the slip control, when the pitch damping control is being performed than when the pitch damping control is not being performed.

2. The control apparatus according to claim 1, wherein the electronic control unit is configured to reduce the threshold as an amplitude of the output torque of the motive power source that is fluctuated during the pitch damping control increases.

3. A control method for a vehicle, the vehicle including a motive power source, a fluid transmission device that is provided in a motive power transmission path between the motive power source and a driving wheel of the vehicle, and a lockup clutch that is configured to couple an input rotary member and an output rotary member of the fluid transmission device to each other, the control method comprising:

(i) correcting an oil pressure supplied to the lockup clutch through feedback control such that an actual amount of slip in the lockup clutch becomes equal to a target slip amount, during slip control for operating the lockup clutch in a slipping manner, (ii) stopping the slip control during the slip control, when a deviation between the actual amount of slip and the target slip amount is equal to or larger than a threshold when the feedback control is being performed, (iii) performing pitch damping control for damping pitch vibrations of the vehicle by fluctuating an output torque of the motive power source, and (iv) making the threshold smaller during the slip control, when the pitch damping control is being performed than when the pitch damping control is not being performed.

4. The control method according to claim 3, wherein the threshold is reduced as an amplitude of the output torque of the motive power source that is fluctuated during the pitch damping control increases.

* * * * *